May 26, 1970   J. F. CLARKE   3,513,535
METHOD OF CERAMIC BRAZING
Original Filed Feb. 26, 1964   3 Sheets-Sheet 1
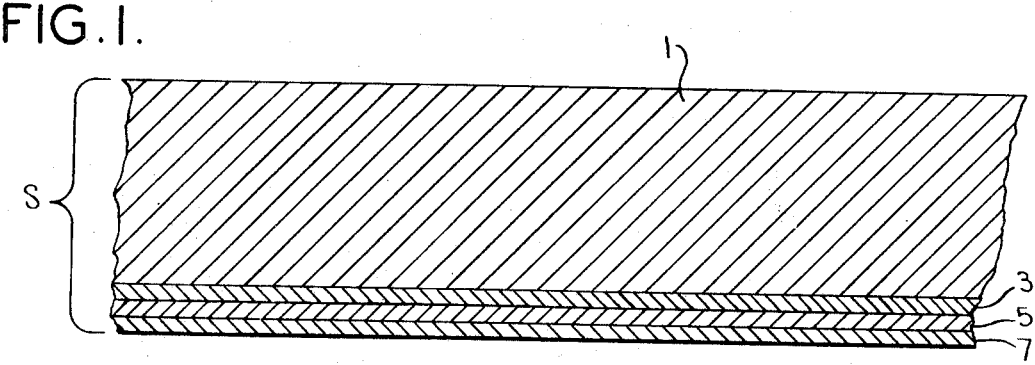
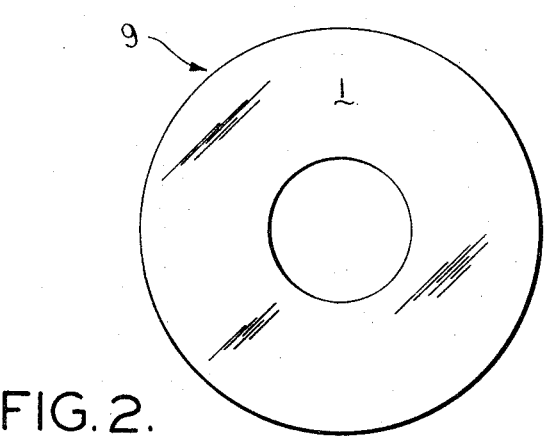
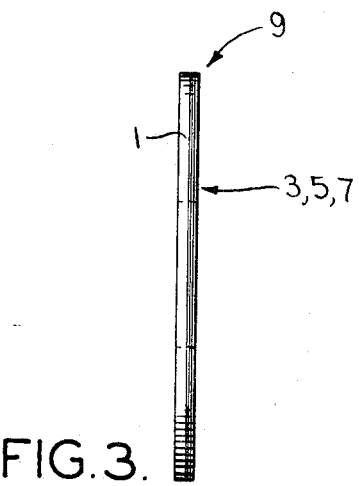
FIG.2.   FIG.3.
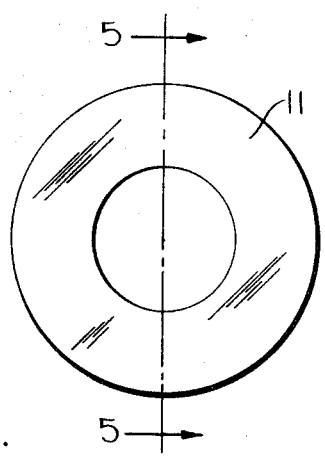
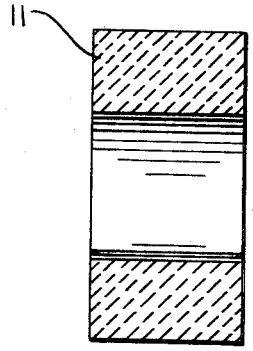
FIG.4.   FIG.5.
John F. Clarke,
Inventor.
Koenig, Senniger, Powers and Leavitt,
Attorneys.

May 26, 1970  J. F. CLARKE  3,513,535
METHOD OF CERAMIC BRAZING
Original Filed Feb. 26, 1964  3 Sheets-Sheet 2
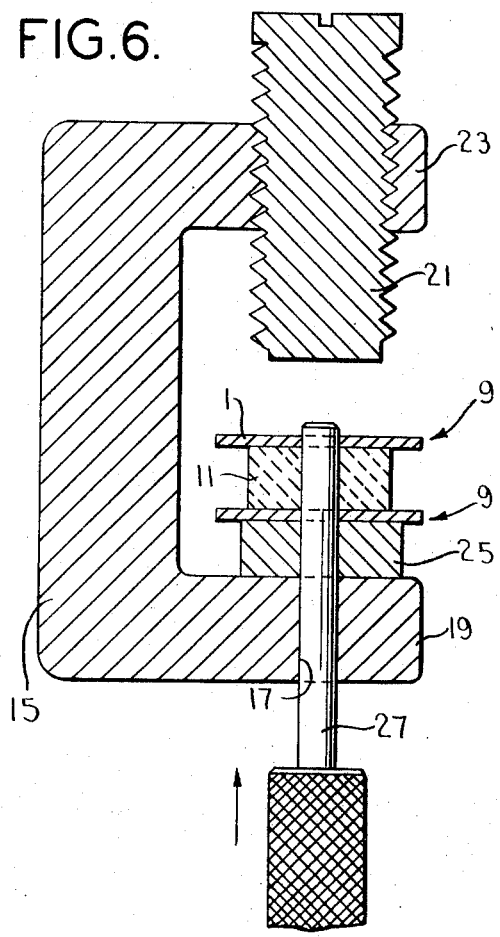
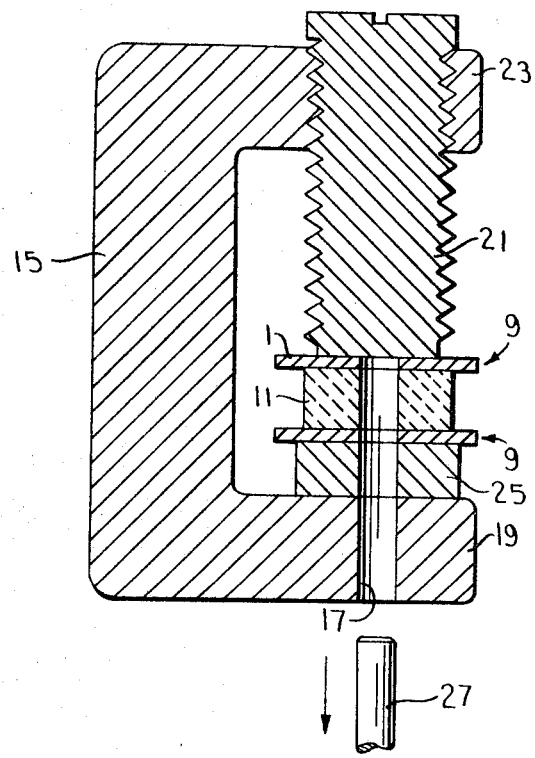
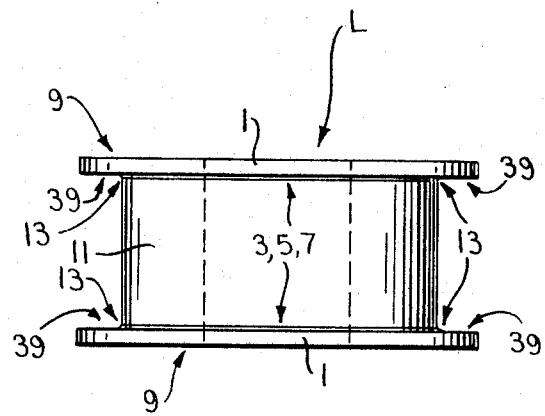

May 26, 1970    J. F. CLARKE    3,513,535

METHOD OF CERAMIC BRAZING

Original Filed Feb. 26, 1964    3 Sheets-Sheet 3

John F. Clarke,
Inventor.
Koenig, Senniger, Powers and Leavitt,
Attorneys.

United States Patent Office 3,513,535
Patented May 26, 1970

3,513,535
METHOD OF CERAMIC BRAZING
John F. Clarke, Plainville, Mass., assignor to Texas Instruments Incorporated, Dallas, Tex., a corporation of Delaware
Original application Feb. 26, 1964, Ser. No. 347,610, now Patent No. 3,382,052. Divided and this application Oct. 5, 1967, Ser. No. 677,829
Int. Cl. B23k *31/02*
U.S. Cl. 29—473.1                                            11 Claims

ABSTRACT OF THE DISCLOSURE

A method of brazing a ceramic part to a metal part. The metal part is first bonded, by means of solid-phase bonding techniques, to a trilayer solid-phase bonded brazing sheet and the resultant four-layer starting material is then formed, such as by punching, cutting or the like, to the desired shape. The side of the starting material composed of the trilayer brazing sheet is then assembled against the ceramic part and the entire assembly is squeezed together and heated to a temperature at which the trilayer brazing sheet forms a viscous liquid-phase alloy which bonds with the ceramic part. The pressure and temperature are thereafter lowered to solidify the alloy in a bond with the ceramic part.

CROSS-REFERENCE TO RELATED APPLICATION

This application is a division of my earlier application Ser. No. 347,610, filed Feb. 26, 1964, now U.S. Pat. No. 3,382,052.

This invention relates to a method of ceramic brazing, and with regard to certain more specific features, to such methods employing an alloy combining a reactive metal with a relatively nonreactive metal, wherein the reactive metal acts with the ceramic at a brazing temperature to promote good wetting and bonding to the ceramic.

Among the several objects of the invention may be noted the provision of improved brazing methods for connecting ceramic such as alumina to metal or to ceramic; the provision of methods of the class described wherein a layered sandwich of thin sheet components for alloy formation is employed in such a manner as not to complicate required cutting and stamping operations; the provision of brazing methods which will minimize thermally induced stresses and embrittlement at the brazed joints; and the provision of methods of the class described which will produce brazed assemblies having better and constant quality and appearance than heretofore obtained. Other objects and features will be in part apparent and in part pointed out hereinafter.

The invention accordingly comprises the elements and combinations of elements, ingredients and combinations of ingredients, and proportions thereof, steps and sequence of steps, features of construction, composition and manipulation, and arrangements of parts which will be exemplified in the constructions, products and methods hereinafter described, and the scope of which will be indicated in the following claims.

In the accompanying drawings, in which several of various possible embodiments of the invention are illustrated:

FIG. 1 is a greatly enlarged fragmentary cross section of starting material made according to the invention;

FIG. 2 is an enlarged plan view of one form of intermediate product made according to the invention;

FIG. 3 is an edge view of FIG. 2;

FIG. 4 is a plan view of a ceramic member, to be connected with the product shown in FIGS. 2 and 3;

FIG. 5 is a cross section taken on line 5—5 of FIG. 4;

FIGS. 6 and 7 are cross sections of apparatus for assembling the devices shown in FIGS. 2 and 4, FIG. 6 illustrating a first assembly step and FIG. 7 a subsequent assembly step;

FIG. 8 is a typical brazed product made according to the invention;

Corresponding reference characters indicate corresponding parts throughout the several views of the drawings.

Figure 10:
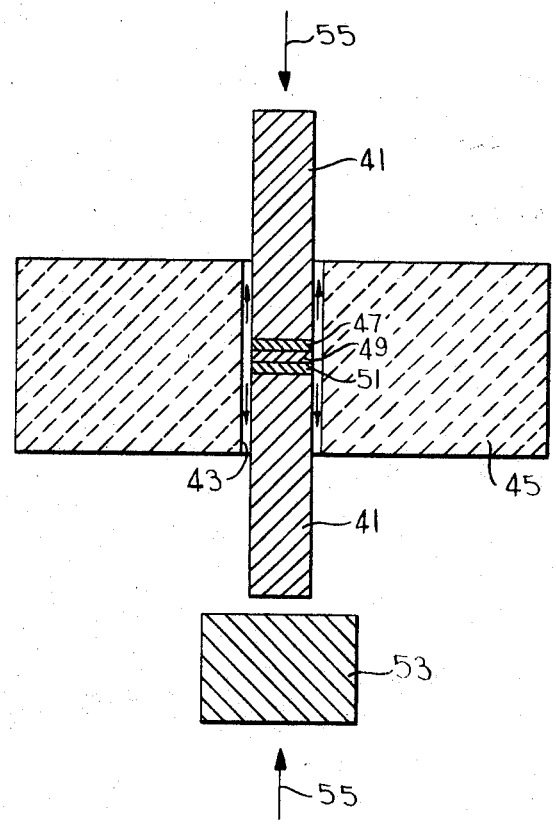
FIG. 10 is a diagrammatic cross section illustrating another product in the process of manufacture according to the invention.

It is known to make a brazing alloy by combining a reactive metal such as titanium with a relatively nonreactive metal such as nickel. Such an alloy is useful for connecting a ceramic such as alumina ($Al_2O_3$) to metal because the said reactive metal reacts with the ceramic at the brazing temperature to promote good wetting and bonding between the brazing alloy and the ceramic member while the brazing alloy adheres to the metal member to which the ceramic is to be connected.

Heretofore the reactive and nonreactive metals according to one method have been melted and cast together by conventional means and then formed or cut to a desired shape for making the desired brazed bond. A second method has been to employ in mixed powder form components which were compacted and sintered and then formed or cut to the desired shape. A third method has been to solid-phase bond two or more layers of the alloy components which have then been rolled out and cut to the desired shape. In the latter case the alloy was produced upon heating at the time that the layers were located in brazing position. The first two methods are restricted to ductile alloys. The chief disadvantage of all of these prior methods was that the final shaping operation of the brazing material was required to be performed on very thin material, which was both difficult and expensive. According to the present invention, the above disadvantages are obviated.

Hereinafter the term metal will be understood to include metal alloys. It will also be understood that the invention is useful in bonding ceramic to ceramic, although the case of bonding ceramic to metal is described by way of example. The term solid-phase bonding means the bonding of two metals without the formation between the metals of any liquid phase. Typical solid-phase bonding processes are set forth in U.S. Pats. 2,691,815 and 2,753,623 and their disclosures are incorporated herein by reference. The term liquid phase is intended to cover either the phase in which the liquid is free-running or viscous, unless otherwise stated. Since the thicknesses of layers hereinafter described are very small, they are not to scale in the drawings.

Referring now more particularly to FIG. 1, there is shown at numeral 1 a sheet of any suitable base metal which is appropriately to be formed and to which an appropriately formed ceramic part is ultimately to be attached. Preferably, although not necessarily, as will appear, the metal 1 should have a coefficient of thermal expansion approximating that of the ceramic which is to be joined thereto. For example, in the case of the ceramic alumina ($Al_2O_3$), a desirable alloy for the base layer 1 might be 42% or 46% nickel, with the remainder iron in each case. Or the material 1 may be Kovar, which is an alloy consisting of 29% nickel, 17% cobalt and the balance iron, with a trace of manganese. Other formulations for the layer 1 will suggest themselves in view of the following complete description of the invention.

In accordance with the invention, a brazing sheet is made up by layers 3, 5 and 7, consisting for example of silver (Ag), titanium (Ti) and silver (Ag) in thicknesses of 0.005 inch, 0.010 inch, and 0.005 inch, respectively. These layers 3, 5 and 7 are preliminarily solid-phase bonded to one another according to processes such as described, for example, in said patents. The 0.020 inch sandwich 3, 5, 7 is then solid-phase bonded to the desired metal layer 1, which latter initially may be 0.075 inch thick. The resulting four-layer, bonded sheet is finish-rolled to 0.015 inch to form a starting material S, as illustrated in FIG. 1. This material is of sufficient thickness to be mechanically worked to a desired shape, such as by forming, punching, cutting or the like, without incurring distortions which in the case of very thin materials required costly corrective measures. For example it is difficult satisfactorily to form, punch or cut thin material such as those in the trilaminate assembly (3, 5, 7), whether layers 3, 5, 7 are operated upon individually or as a subassembly. Alternately, the three layers 3, 5 and 7 and the metal layer 1 may be solid-phase bonded in the same operation to form the starting material S.

The next step is to form the starting material S so that at least its layer 1 will have a proper final base shape. Thus, for example, there may be conveniently and successfully punched from the material S an annular or washer-like form such as shown at 9 in FIGS. 2 and 3. It will be understood that this form is only one of many that may be employed. The particular one chosen, for example, is to form flanges on a spool-shaped product L as illustrated in FIG. 8. The core 11 of this spool is formed of the ceramic alumina (FIGS. 4 and 5). The ultimate object in this example is to braze two of the four-layer washers 9 to opposite sides of the core 11 to form the spool shape L. In order to do this the side composed by the layers 3, 5, 7 of each of two washers 9 is aligned and faced in assembly against an end of the core 11. The assembly is then heated to brazing temperature to form a liquid-phase alloy of layers 3, 5 and 7. Upon cooling and solidification, the bonded product such as in FIG. 8 results, wherein the ceramic core 11 has been provided with attached flanges composed of the metal 1.

A suitable brazing temperature for material such as above described is 2,000° F., for a half hour in a vacuum of $6 \times 10^{-4}$ mm. Hg. Titanium in the resulting molten silver reacts with the alumina, promoting wetting and bonding. An advantage thus far will be seen to be that the forming and cutting of the brazing components 3, 5, 7 can, in their position of attachment to the formed material 1, be done along with the forming and cutting of this material. As a consequence, thinner sections of the brazing alloy can be used than if an attempt were made to cut each individual layer 1, 3, 5 or 7 to shape prior to any bonding; or if an attempt were made individually to form the layer 1 on the one hand and a separate composite layer 3, 5, 7 on the other hand, prior to bonding the latter (3, 5, 7) to layer 1.

When the layers 3 and 7 have the same melting point as in the case above given, they melt at the same temperature. As a result, the braze metal not in contact with the ceramic as at 39 in FIG. 8 may ripple enough to cause uneven oxidation upon cooling. This condition would not occur if the diameter of 9 were equal to the diameter of core 11. But if in the case illustrated uneven oxidation is not to be tolerated at 39 in the finished product, it can be overcome as follows:

The four layers 1, 3, 5, 7 in the completed material S, ready for forming operations, may be composed as follows, for example: layer 1 may be Kovar or the like, .015 inch thick; layer 3 (Ag), .0004 inch thick; layer 5 (Ti) .0008 inch thick; and layer 7 (a silver-copper alloy; 72% Ag–28% Cu), .0008 inch thick. The whole bonded assembly S will then be .017 inch thick. In such case base 1 is 0.15 inch thick and the attached trilaminate assembly (3, 5, 7) is .002 thick. This selection of materials for the layers 3, 5, 7 has the advantage that the layer 3 has a higher melting point than the layer 7. As a result, the surface of the exposed braze metal as at 39 (FIG. 8) becomes smoother and more evenly oxidized. Because the layer 3 does not melt at the temperature required to melt the layer 7, the layer 3 tends less to form any brittle compounds with the adjacent layers. Moreover, accurate fillet formation during brazing is more readily controlled at 13 (FIG. 8).

Sometimes the active metal for layer 5 or 35 (referred to hereinafter), instead of being titanium, can advantageously be otherwise composed. This is for the reason that during the rolling to final size the titanium sometimes does not deform a constant amount along the length of the rolled strip material. This results in localized areas of incorrect titanium concentration, which may cause the quality of the braze to vary throughout the assembly.

Then when the joint is heated to too high a temperature or for a longer time than necessary to diffuse the titanium to an even concentration, the joint becomes brittle and highly stressed. In such cases there could be substituted for the titanium intermediate layer 5 an alloy layer such as columbium containing 10% titanium and 5% zirconium, which is known as alloy D–36. Suitable designations for the laminate illustrated in FIG. 1 would then be as follows: layer 1, Kovar; layer 3, (Ag); layer 5, (alloy D–36); layer 7, (72% Ag–28% Cu) in a thickness ratio of 18:1:1:2, rolled to an over-all thickness S of 0.017 inch. Upon heating this combination with alumina in contact with layer 7 to 1,500° F. for five minutes, a brazed joint is produced which is in some cases superior to one employing titanium as the active metal. This is for the reason that the active alloy D–36 deforms evenly along the length of the strip, resulting in a concentration of active metal and constant quality of braze in all areas of the joint. Also, the amount of active metal D–36 in the thin layer 5 dissolved in the molten braze metal is limited, to produce a more ductile joint. Moreover, the thermal expansion of the D–36 alloy better matches the thermal expansion of the alumina than does titanium. This reduces residual stresses in the joint upon cooling. In fact, minimization of stress can be adjusted at will by controlling the amount of alloy D–36 present.

I have found that appropriate control of time, temperatures, and holding pressure during the heating operation for brazing results in a better brazed product. If the brazing temperature is too low, there results incomplete production of a liquid phase of the alloy made by layers 3, 5, 7 with consequent incomplete wetting of the base metal 1 and the ceramic 11. This results in a weak, porous bond. When the temperature is too high, excessive flow of the completely liquid alloy formed by the composite 3, 5, 7 mars the appearance by run-out and limits the usefulness of the metal-ceramic assembly. For example, there may result an unduly large filleting effect at the regions 13 in FIG. 8 because of loss of liquid from between members 1 and 11. A solution to this problem is to employ a brazing temperature below that corresponding to the optimum liquid flow temperature of the composite 3, 5, 7. Thus the temperature is brought only to the point at which the composite 3, 5, 7 assumes a viscous liquid phase, as distinguished from a free-flowing liquid phase. In addition, under such a condition, squeezing pressure is applied. The viscous liquid phase is sufficient to bring about alloying, and the pressure applied during heating forces the viscous alloy to spread over the ceramic surface through the desired area without running out excessively.

Convenient apparatus for obtaining squeezing pressure during heating is illustrated in FIGS. 6 and 7, in which numeral 15 illustrates a jaw clamp formed of a material having a low coefficient of thermal expansion such as graphite. A hole 17 is provided in one jaw 19 and a graphite screw member 21 is threaded through the other jaw 23. A ring of material 25, having a high coefficient of thermal expansion, is also provided. At 27 is shown a pin adapted to be pushed through the hole 17 to form a stacking guide for the ring 25 and the members 9 and 11 (FIG. 6). Then the screw-threaded member 21 is screwed down into mere holding contact with the upper washer 9, the pin 27 being withdrawn (FIG. 7). The assembly 9, 11, 9 and 25 thus held in the clamp is placed in the heating furnace and during a suitable time raised to a temperature corresponding to the viscous liquid phase of 3, 5, 7. This is just below the optimum or liquid flow temperature. This temperature also causes the ring 25 and layers 9, 11 and 9 to expand and to bring about gradually rising squeezing pressure as the alloying viscous liquid phase occurs. This spreads or pushes the alloy all over the surfaces to be converted without further outflow. Then when the clamp is removed from the furnace and cooled, solidification of the viscous alloy material occurs, along with shrinkage of the ring 25 and layers 9, 11 and 9, whereupon the product may be removed and is ready for use as shown in FIG. 8. Its advantage then is that of a strong joint without disfiguring run-out thereon of any braze material. Thus in the FIG. 8 form, the fillets at 13 are of minimal size. Alternatively, where a sufficient differential of thermal expansion exists between layers 9, 11 and 9 and jaw clamp 15, the ring 25 may be omitted.

Sometimes it may be desirable to effect bonding between a ceramic member and a backing material such as 1, wherein said backing material and the ceramic member have widely different coefficients of thermal expansion. In such a case, with certain configurations of final products the thermal stresses produced in the joint of the final product during cooling may cause bond failures. To overcome this, a buffer metal with an intermediate coefficient of thermal expansion between those of the ceramic member and the backing member 1 can be initially bonded between such member 1 and the bonding trilaminate assembly. This is shown for example in FIG. 9, wherein five layers are solid-phase bonded to provide the material to be punched, sheared or otherwise formed. At numeral 29 is shown part of the backing layer, corresponding to layer 1 in FIG. 1; layer 31 is the buffer layer; and layers 33, 35 and 37 are the component layers adapted to form the brazing alloy. It will be understood that all of the layers 29, 31, 33, 35 and 37 are solid-phase bonded to form the material from which objects such as 9 are formed for subsequent attachment to ceramic articles such as 11.

Sometimes bonds are required that do not admit of assembling the brazing trilaminate assembly such as (3, 5, 7) or (33, 35, 37) to the backing material such as 1, prior to mechanical forming operations. Such a case is illustrated in FIG. 10, wherein it is desired to braze two metal pins 41 (composed, for example, of Kovar) into a hole 43 in a block of ceramic 45. In such case an unbacked trilaminate material (47, 49, 51) is used, having a cross section near that of the pins 41. This is inserted into the space 43 between the pins in the hole 43. In addition, a block of high-expansion metal 53, such as the metal which makes up the ring 25 in FIGS. 6 and 7, may be provided if necessary. Then the assembly is placed in a suitable clamp to provide light pressure in the direction indicated by the arrows 55. This pushes together parts 41, 47, 49, 51 in the hole 43. In this condition the assembly is placed in a furnace. Heating is carried out to a point such that a viscous condition of the alloy from the layers 47, 49 and 51 is produced. As the block 53 expands, this viscous liquid-phase material is forced to spread along all of the available interfaces between members 41 and 45. Thus upon removal from the furnace a junction is formed between each pin 41 and the ceramic 45, as well as a junction between the pins themselves.

The form of connection provided by the process illustrated in FIG. 10 does not take advantage of any unitary assembly of layers such as 1, 3, 5, 7, inasmuch as the brazing layers 47, 49, 51 are independent of any stiffening base layer. The showing of FIG. 10, does however emphasize an advantageous feature of the invention, taken in and of itself. This is the heating under pressure of the alloyable trilaminate material only to the viscous liquid-phase temperature. In this case (FIG. 10), by not carrying the heating step to a temperature which will cause free liquid flow, there is avoided the condition of excessive run-out and starvation of the alloy in the joint. As will be seen from FIG. 10, excessive outflow would weaken the connection between the pins 41 and ceramic 45. In the case of viscous flow under pressure, this does not occur.

Figure 9:
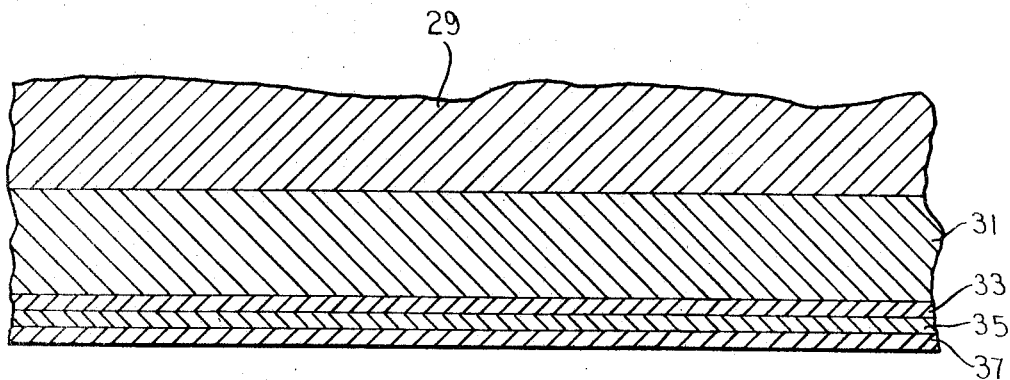
FIG. 9 is a view similar to FIG. 1, illustrating another form of a starting material made according to a modification of the invention.

Summarizing, the invention has several important features:

(1) No punching and handling of extremely thin parts need to be resorted to, such as would lead to difficulties in making devices such as shown in FIG. 8 from material such as shown in FIG. 1 or FIG. 9. As a result, a high degree of accuracy may be maintained in the finished product.

(2) By making layers such as 3 and 7 in the trilaminate assembly of different materials, the former having the higher melting point, a less brittle joint of better appearance may be maintained.

(3) By using a thin layer of active metal other than titanium in the trilaminate assembly, that is to say D–36 for example, a very even concentration of the same in the alloy can be obtained. This results in an even quality of braze throughout a joint.

(4) By melting the alloy formed by the trilaminate assembly such as (3, 5, 7) or (33, 35, 37) only to the viscous state and squeezing it in this state to spread in a controlled manner, rather than running away, a stronger and superiorly formed joint S is obtained, whether of the variety such as shown in FIG. 8, or as shown in FIG. 10.

In view of the above, it will be seen that the several objects of the invention are achieved and other advantageous results attained.

As various changes could be made in the above constructions, methods and products without departing from the scope of the invention, it is intended that all matter contained in the above description or shown in the accompanying drawings shall be interpreted as illustrative and not in a limiting sense.

What is claimed is:

1. The method of forming a brazed joint between objects at least one of which is a metal and another a ceramic, comprising locating between at least two of the objects components constituted by metals which when heated to form an alloy will form a bond between at least one of the metal objects and the ceramic object, and simultaneously squeezing said two objects with said components between them while heating only to a temperature which will transform said components while under pressure into a viscous liquid phase so as controllably to flow on the ceramic, and thereafter cooling to solidify the alloy.

2. The method according to claim 1, wherein squeezing pressure is gradually increased with gradual rise in temperature.

3. The method of brazing a metal part to a ceramic part, comprising solid-phase bonding to the metal part a multiple laminate assembly, the laminations themselves of which are solid-phase bonded and contain among them a metal active in an alloy of the same to bond to the ceramic, and simultaneously squeezing and heating the multiple laminate assembly between the ceramic and metal parts only until a temperature is reached at which the multiple laminate assembly while under pressure forms a viscous liquid-phase alloy so as to controllably flow on the ceramic, and thereafter releasing the pressure and lowering the temperature to solidify the alloy.

4. The method of brazing a ceramic part to a metal part, comprising solid-phase bonding to a sheet of the metal a multiple laminate assembly, the laminations themselves of which are solid-phase bonded and contain among them a metal active in an alloy of the same to bond to the ceramic, mechanically forming the solid-phase bonded sheet and assembly, thereafter simultaneously squeezing and heating the multiple laminate assembly between the ceramic and formed metal parts only to a temperature at which the multiple laminate assembly forms a viscous liquid-phase alloy, and thereafter releasing the pressure and lowering the temperature.

5. The method of brazing a ceramic part to a metal part, comprising solid-phase bonding to a substantially flat supporting sheet of metal which is to become part of a laminated metal assembly, laminations which are solid-phase bonded and contain among them a metal active in an alloy of the same to bond to the ceramic, mechanically forming said bonded part and assembly, and thereafter simultaneously squeezing and heating the laminated metal assembly between the ceramic and metal parts only until a temperature is reached at which the laminated metal assembly forms a liquid-phase alloy in a viscous state, and thereafter releasing the pressure and lowering the temperature to solidify the alloy.

6. The method of brazing a ceramic part to a metal part, comprising bonding a layer of metal which forms the metal part and a bonded group of metal layers to form an alloy, the latter layers containing among them a layer formed of a metal active in the alloy to bond to the ceramic, contacting the ceramic part with the outer one of said group of layers, heating and squeezing said group of layers between the ceramic part and the metal layer until but only until a temperature is reached at which a liquid-phase alloy is formed in a viscous state which controllably spreads on the ceramic and thereafter releasing the pressure and lowering the temperature to solidify the alloy in a bond with the ceramic part.

7. The method of brazing a ceramic part to a metal part, comprising assembling and solid-phase bonding first and second metal layers, the first one of which is to constitute the metal part, with a group of metal layers to form an alloy braze, said group of layers containing among them a layer formed of a metal active in the alloy to bond to the ceramic, contacting the ceramic part with the outer one of said group of layers, heating and squeezing said group of layers between the ceramic part and the second metal layer until but only until a temperature is reached at which a liquid-phase alloy is formed in a viscous state so as to controllably spread on the ceramic, and thereafter releasing the pressure and lowering the temperature to solidify the alloy in a bond with the ceramic part.

8. The method of brazing a ceramic part to a metal part, comprising solid-phase bonding a multiple laminate assembly to a metal supporting part, the laminations being solid-phase bonded together and containing among them a metal active in an alloy of the same to bond to the ceramic part, the laminations having a lower melting point than that of either the metal or ceramic parts, mechanically forming said metal part and laminate assembly, thereafter contacting the ceramic part with the outer layer of said laminate assembly, simultaneously heating and squeezing said laminate assembly between said metal and ceramic parts until a temperature is reached at which the laminate assembly forms a liquid-phase alloy, and thereafter reducing the pressure and temperature to solidify the alloy.

9. The method according to claim 8, further comprising solid-phase bonding a buffer metal between the metal part and the laminate assembly prior to mechanically forming said metal part and laminate assembly, said buffer metal having a coefficient of thermal expansion intermediate those of the ceramic and metal parts.

10. The method according to claim 8, wherein squeezing pressure is gradually increased with gradual rise in temperature so as to force the alloy to controllably spread on the ceramic.

11. The method according to claim 8, wherein the parts are heated only until a temperature is reached wherein the laminate assembly forms a viscous liquid-phase alloy so as to controllably spread on the ceramic.

References Cited
UNITED STATES PATENTS

| | | | |
|---|---|---|---|
| 1,197,615 | 9/1916 | Eldred | 29—195.5 |
| 2,362,893 | 11/1958 | Durst | 29—504 X |
| 3,031,737 | 5/1962 | Conley | 29—473.1 X |
| 3,068,564 | 10/1962 | Weidt | 29—472.3 X |
| 3,209,450 | 10/1965 | Klein et al. | 29—501 X |

CHARLIE T. MOON, Primary Examiner

R. J. SHORE, Assistant Examiner

U.S. Cl. X.R.

29—195, 498